United States Patent Office 3,095,177
Patented June 25, 1963

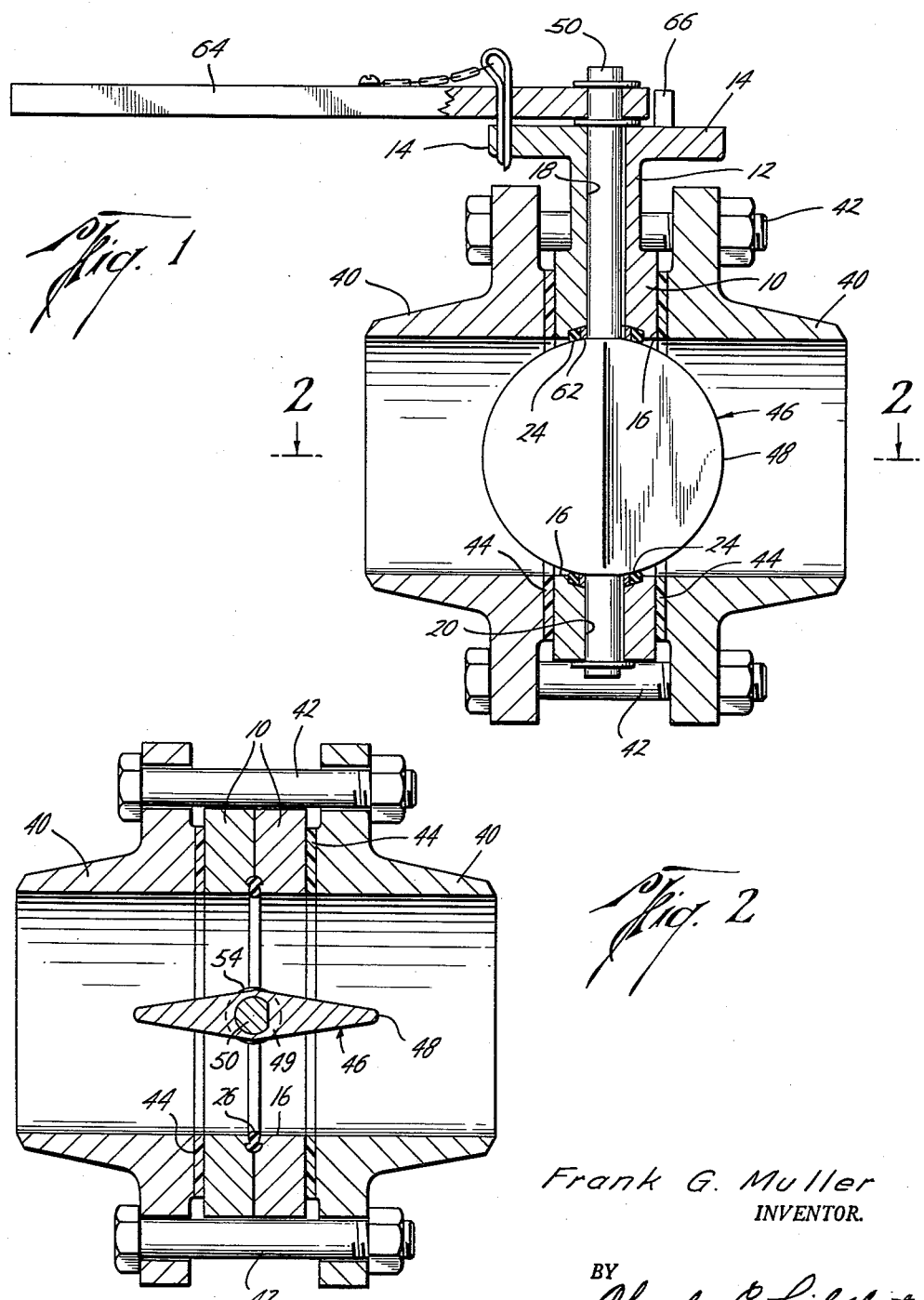

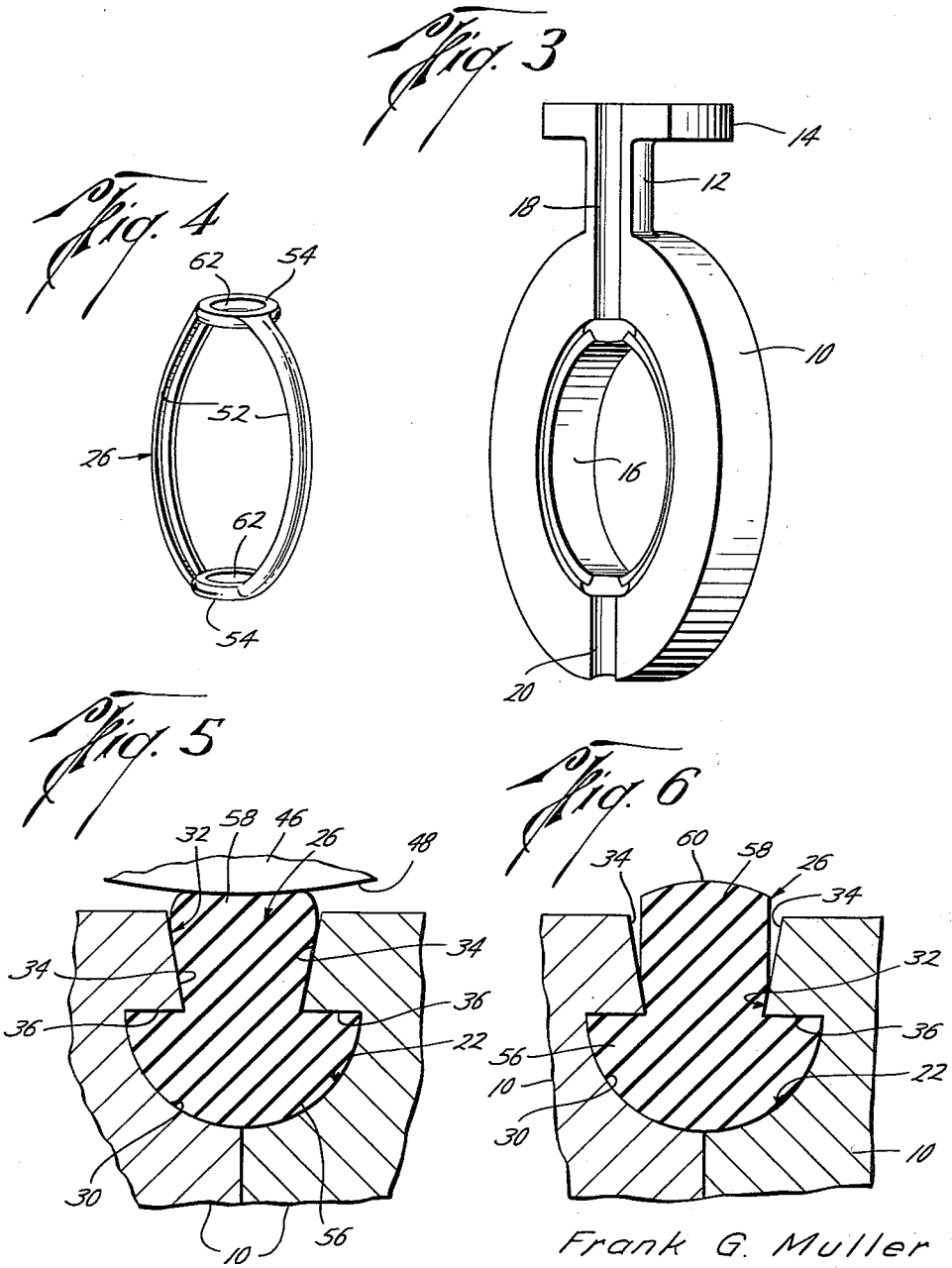

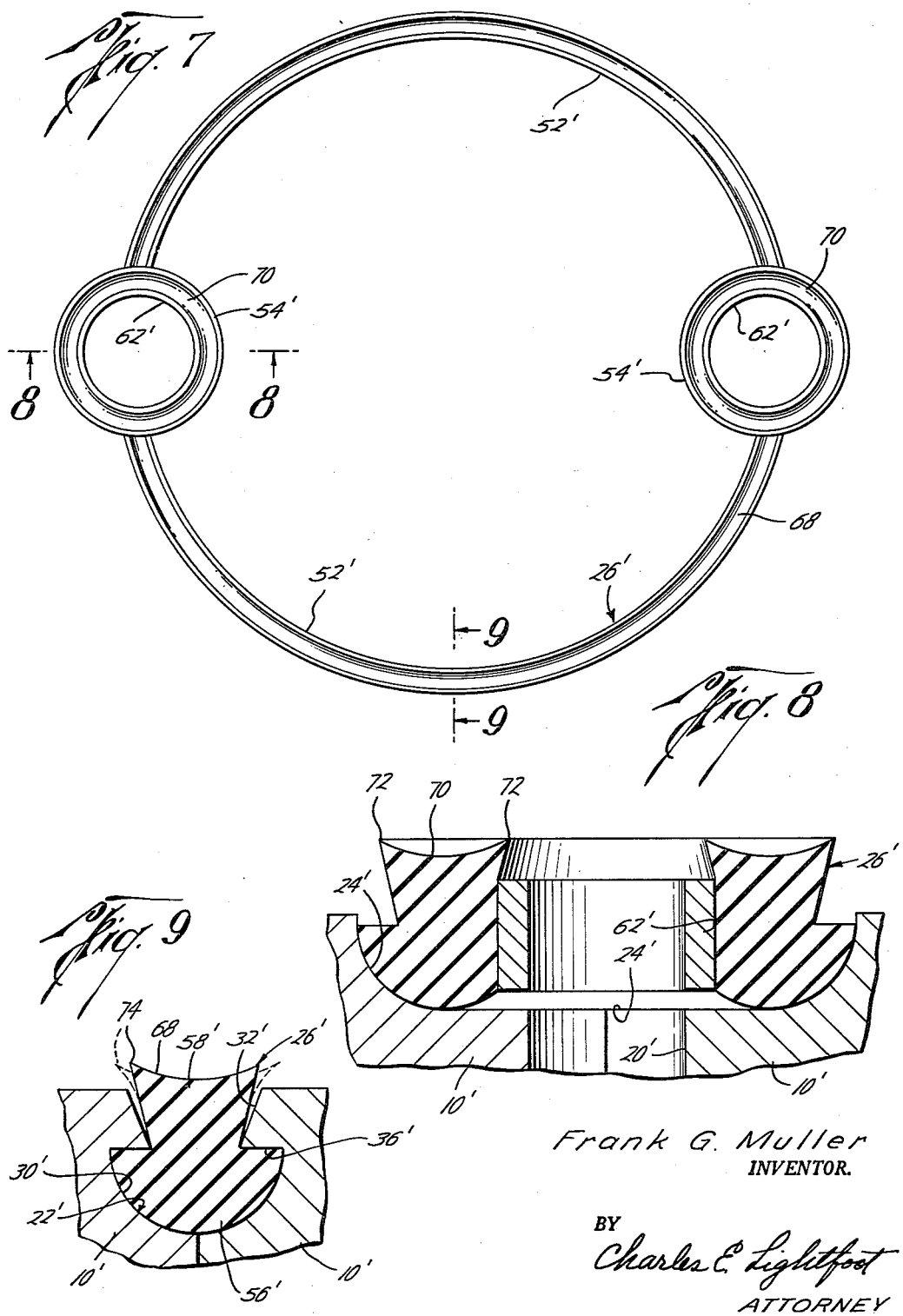

3,095,177
VALVE ASSEMBLY AND SEAL FORMING
MEANS FOR THE SAME
Frank G. Muller, Box 967, La Porte, Tex.
Filed Mar. 10, 1961, Ser. No. 94,894
8 Claims. (Cl. 251—173)

This invention relates to valves and more particularly to a valve of the disk or butterfly type, in which the valve casing is formed in two parts and sealing means of unitary design is provided, which is positioned to form a fluid tight seal between the parts of the casing and between the casing and valve disk.

The invention has for an important object the provision of a valve of the disk or butterfly type having a valve casing formed in two parts and having seal forming means of unitary design which is adapted to be easily assembled with the casing and valve, and which forms a seal between the parts of the casing and between the casing and valve around the valve stem in all positions of the valve, and also between the casing and valve disk when the valve is closed.

Another object of the invention is to provide a valve assembly of the disk or butterfly type in which the valve disk and stem are held out of direct contact with the casing in all positions of the valve.

A further object of the invention is the provision of a valve of the type referred to embodying seal forming means whereby the valve disk is movably supported in a floating condition in out-of-contact relation to the valve casing in position for rotation therein into and out of closing relation to the flowway.

Another object of the invention is the provision in a valve assembly of the kind mentioned of seal forming means of unitary construction designed to be economically formed by molding and easily inserted in the valve casing, and which has portions shaped for sealing contact with the valve housing and valve stem in all positions of the valve and for sealing contact with the housing and valve disk when the valve is closed.

A further object of the invention is to provide a valve assembly of the type referred to in which the parts are constructed for coaction to cause an increase in the sealing effect between the valve disk and housing upon the occurrence of an increase in the pressure in the flowway when the valve is closed.

Another object of the invention is the provision of a valve of the kind mentioned in which the parts are designed to form an effective seal when the valve is closed regardless of the direction of flow of fluid in the line.

The above and other important objects and advantages of the invention may best be understood from the following detailed description, constituting a specification of the invention, reference being had to the annexed drawings, wherein—

FIGURE 1 is a longitudinal, central, cross-sectional view of a preferred embodiment of the valve assembly of the invention showing the valve disk in open position;

FIGURE 2 is a cross-sectional view taken along the line 2—2 of FIGURE 1, looking in the direction indicated by the arrows;

FIGURE 3 is a perspective view of one of the two parts of the valve housing showing the same separated from the other parts of the assembly;

FIGURE 4 is a perspective view of a preferred form of seal forming element of the invention, showing the manner in which the same is held preparatory to the insertion of the element in the valve housing during the assembling of the valve;

FIGURE 5 is a fragmentary, radial cross-sectional view, on a somewhat enlarged scale, showing the cross-sectional shape of the seal forming element and the groove of the valve housing in which the same is adapted to be positioned when the housing is assembled, the valve disk being shown in closed position;

FIGURE 6 is a view similar to that of FIGURE 5, showing the position of the seal forming element with the valve disk in open position;

FIGURE 7 is a side elevational view, on a somewhat enlarged scale illustrating a somewhat modified form of the seal forming element of the invention;

FIGURE 8 is a cross-sectional view, on a greatly enlarged scale, taken along the line 8—8 of FIGURE 7, looking in the direction indicated by the arrows; and FIGURE 9 is a cross-sectional view, similar to that of FIGURE 8, taken along the line 9—9 of FIGURE 7, looking in the direction indicated by the arrows.

Referring now to the drawings in greater detail the valve assembly of the invention includes a valve housing or casing formed in two identical parts 10, 10 each provided with counterbores or recesses positioned to form a groove to receive a seal forming element and openings for the stem of a valve disk rotatably disposed in the housing to open and close the flowway of the same when the housing is assembled.

Each of the housing parts 10, 10 is of generally ring shape having a neck portion 12 formed with an external flange 14 at its outer end, and also having a central opening 16 forming a flowway for the valve when the parts are assembled. The parts 10, 10 are also provided with radially extending semi-circular grooves 18 and 20 positioned to form bearing openings in which the stem or shaft of the valve may be rotatably extended when the parts are assembled.

Each of the housing parts 10, 10 has arcuate recess portions 22, 22 formed in one face thereof extending about the opening 16 and diametrically positioned annular recess portions 24, 24 surrounding the openings formed by the grooves 18 and 20 and which merge with the recess portions 22, 22. The recess portions 22 and 24 are shaped to form an internal groove in the housing surrounding and opening into the flowway of the housing when the parts are assembled and within which a seal forming element 26 may be positioned in surrounding relation to the valve stem and surrounding and extending into the flowway in position for sealing engagement with the valve disk and housing to prevent leakage of fluid from the flowway about the stem in all positions of the valve and to prevent leakage past the valve disk when the valve is closed.

As best seen in FIGURES 5 and 6, the recess portions 22, 22 are preferably shaped to form an outer groove portion 30 which is widened longitudinally of the flowway and a narrower inner groove portion 32 whose side walls 34 converge radially outwardly from the flowway to provide radially outwardly facing shoulders 36, positioned for coaction with the seal forming element 26 to clamp the same in the groove. The bottom wall of the inner groove portion may be rounded as shown at 30.

The bottom walls of the annular recess portions 24, 24 may be of spherical shape, and the side walls of these portions may be curved.

The housing parts 10, 10 are adapted to be assembled with the faces of the same, in which the groove forming recesses are located in contact, and the housing parts are then inserted between flange fittings 40, 40 which are bolted together by bolts 42 in the usual manner, suitable seal forming means such as the gaskets 44 being inserted between the housing parts and the fittings to form fluid tight seals therebetween.

The valve assembly includes a valve 46 which is preferably of the disk type, formed with an external, spherical closing face 48, and having a valve stem 50 which is rotatably extended through the stem receiving grooves formed by the recesses 18 and 20 of the valve housing parts.

The valve disk is formed with a widened, central, diametrically extending portion 49, through which the stem 50 extends, and which is of a width to provide surfaces on the disk about the stem against which the annular portions 54 of the seal forming element are in sealing contact in all positions of the valve.

The seal forming element 26 is preferably formed of suitable resilient material, such as rubber, or the like, and is of generally circular shape, having arcuate portions 52 which are shaped to fit within the groove portions formed by the recess portions 22, 22 of the housing parts 10 and diametrically oppositely positioned annular portion 54, which are shaped to fit within the annular groove portions formed by the annular recess portions 24, 24 of the housing parts about the valve stem. The arcuate portions 52 of the seal forming element are preferably of the cross-sectional shape, illustrated in FIGURES 5 and 6, wherein these portions are formed with outer widened portions 56, adapted to fit within the outer groove portions, in contact with the shoulders 36 thereof, and narrower inner portions 58 adapted to extend inwardly into the flowway between the outwardly converging walls 34 of the groove portions 32. The annular portions 54 of the seal forming element are preferably of generally O-shape in cross-section to fit within the annular groove portions formed by the recess portions 24, 24 surrounding the stem of the valve, in sealing contact with the valve housing entirely about the stem to prevent leakage of fluid from the flowway past the stem in all positions of the valve. The inner extremities of the arcuate portions 52 of the seal forming element may be rounded, as indicated at 60, and the inner portions 58 of the seal forming element are preferably of somewhat less width than the distance between the inner extremities of the converging walls 34, so that the inner extremities of the portion 58 may move longitudinally of the flowway during opening and closing movements of the valve.

With the parts assembled in this manner, the portions 52 of the seal forming elements will be positioned as shown in FIGURE 6 when the valve is in open position, and when the valve is moved to closed position, as illustrated in FIGURE 5, the portions 58 will be expanded between the walls 34 to form a tight seal with the valve and housing. The annular portions 54 of the seal forming element, however, will be at all times in sealing contact with the valve and housing entirely about the valve stem 50, to prevent leakage of fluid from the flowway past the stem in all positions of the valve. Due to the fact that the portions 58 of the seal forming element are of less width than the distance between the inner extremities of the walls 34, there will be space provided into which the material of the seal forming element may move when the seal forming element is compressed into the groove by closing of the valve. Moreover, because of the spherical shape of the closing surface 48 of the valve, the clearance between the valve and housing when the valve is closed will be somewhat tapered, so that any increase in the pressure of fluid in the flowway will exert a force on the portions 58 of the seal forming element, tending to wedge the material of the element more tightly between the valve and housing to increase the sealing effect of the seal forming element when the valve is closed.

Each of the annular portions 54 of the seal forming element has an inner annular, metallic reinforcing element 62, surrounding the valve stem, and which is preferably of a slightly larger diameter than the diameter of the stem, and also of somewhat shorter length than the distance between the bottom of the annular groove portion formed by the recess portions 24, 24 and the inner extremity of the seal forming element, whereby this reenforcing member 62 is maintained out of contact with the housing and valve, so that it does not interfere with the sealing contact of the element with the valve and housing about the valve stem.

The seal forming element is constructed to sealingly engage the housing parts when the same are assembled, to prevent any outflow of fluid from the flowway between the parts.

The valve stem 50 may be provided with the usual operating handle 64, by which the valve may be rotated in the housing and suitable means such as a stop lug 66 on one of the housing parts 14 in position for engagement with the handle to limit rotational movement of the valve.

A somewhat modified form of the seal forming element of the invention is illustrated in FIGURES 7, 8 and 9, wherein structure similar to the corresponding structure of FIGURES 1–6 is indicated by the same reference numerals with a prime marker and wherein the element has arcuate portions 52′ and annular portions 54′, whose inner faces are concave as shown at 68 and 70, to form lip portions 72 and 74, positioned for sealing engagement with the valve disk. By the provision of such lip portions, an increase in the pressure in the flowway will result in the exertion of a force on the lip portions tending to urge the sealing element into tighter sealing contact with the valve disk, whereby leakage of the valve when the same is closed will be prevented. Moreover, in the event that there should be some irregularity in the shape of the closing surface of the valve disk, such as might result in imperfect sealing contact of the disk with the seal forming element when the valve is closed, the seal forming element will be pressed into sealing contact with the disk by the pressure of the fluid in the flowway when the valve is closed.

In other respects, this modified form of the seal forming element is similar to that illustrated in FIGURE 4. The seal forming elements of the invention are preferably constructed by molding the same of suitable resilient material, such as rubber, or the like, with the centers of the arcuate portions 52 and the annular portions 54 located on the same line, and the surfaces of the inner extremities of these portions arranged substantially in the same plane, as best illustrated in FIGURE 7, by so constructing the seal forming elements, the molding of the same may be easily and economically carried out. When the seal forming elements are formed in this manner, it will be apparent that the annular portions 54 may be turned to position substantially normal to the general plane of the arcuate portions 52, as shown in FIGURE 4, to enable the seal forming element, to be assembled with the housing parts.

It will thus be seen that the invention, constructed and assembled as described above, provides a valve of the disk or butterfly type in which the seal forming element is easily inserted between the parts of the valve housing in assembling the same, the seal forming element being effective to provide a seal between the parts as well as forming a seal between the disk and housing about the valve stem in all positions of the valve and a seal between the disk and valve entirely about the circumference of the valve disk when the valve is closed.

The invention is disclosed herein in connection with certain specific embodiments of the same, but it will be understood that these are intended by way of illustration only, and that various changes may be made in the structure and arrangement of the parts, within the spirit of the invention and the scope of the appended claims.

Having thus clearly shown and described the invention what is claimed as new and desired to secure by Letters Patent is—

1. In a butterfly valve assembly a casing having a cylindrical flowway and diametrically oppositely disposed shaft bearings, a valve in the flowway, a shaft mounted for rotation in said bearings and upon which the valve is supported for rotation with the shaft to one position to close the flowway and to another position to open the flowway, said casing having an internal groove provided with annular portions surrounding the shaft and portions extending between and connecting said annular portions, seal forming means formed of resilient material in said groove and extending radially inwardly into the flowway in position for sealing contact with the valve and casing entirely about the flowway and said shaft when the valve is closed and about said shaft when the valve is opened to hold the valve out of contact with the casing in all positions of the valve, and an annular member carried by the seal forming element in surrounding relation to the shaft in each of said annular portions of said groove, said seal forming means extending radially inwardly and outwardly beyond said member into engagement with the valve and casing to hold said member in out-of-contact relation to said valve and casing.

2. In a butterfly valve assembly a casing formed in two parts each having a flat surface and an opening therethrough and a recess shaped to form with the recess of the other part when the parts are assembled with said surfaces in facing relation and said openings positioned in communication to form a flowway, a groove surrounding and opening into the flowway, a valve disk mounted for rotation in the flowway and a seal forming element formed in one piece of resilient material in the groove and having flexible, peripherally extending portions extending into the flowway in position for engagement with the valve radially inwardly of the outermost peripheral portion of the disk under the influence of the pressure of fluid in the flowway to form a seal between the parts about the flowway and between the casing and valve when the valve is closed.

3. In a butterfly valve assembly a casing formed in two parts each having a flat surface and a cylindrical opening and provided with a recess shaped to form with the recess of the other part when the parts are assembled with said faces in facing relation and said openings positioned concentrically to form a flowway, an internal groove surrounding and opening into the flowway and bearings disposed in radially extending diametrically opposite relation from the flowway, portions of said groove being disposed in surrounding relation to said bearings, a valve disk in the flowway, a shaft mounted for rotation in said bearings and upon which the valve is supported for rotation with the shaft to one position to close the flowway and to another position to open the same, seal forming means formed of resilient material in the groove in position to form a seal between the parts and between the valve and casing about said shaft and extending into the flowway for sealing contact with the valve and casing about the shaft in all positions of the valve and having flexible, peripherally extending portions extending radially inwradly beyond the outermost peripheral portion of the disk in position for sealing engagement with peripheral portions of the disk radially inwardly of said outermost portion under the influence of the pressure of fluid in the flowway when the valve is closed.

4. The combination with a valve casing having a cylindrical flowway and diametrically oppositely disposed shaft bearings, a valve disk in the flowway, a shaft mounted for rotation in said bearings and upon which the valve is mounted for rotation with the shaft to one position to close the flowway and to another position to open the same, said casing having an internal groove provided with annular portions surrounding the shaft and portions extending between and connecting said annular portions, of a continuous seal forming element formed of resilient material in the groove and extending inwardly into the flowway in position for sealing contact with the casing in the groove and with the valve around said shaft in all positions of the valve, said element having portions positioned for sealing contact with the casing in the groove and peripherally extending flexible portions extending radially inwardly beyond the outermost peripheral portion of the disk in position for sealing engagement with the disk under the influence of the pressure of fluid in the flowway when the valve is closed.

5. A seal forming element of generally ring shaped configuration formed of resilient material in one continuous piece having a main portion and diametrically oppositely disposed annular portions of smaller diameter than and positioned in the same general plane with said main portion, said main portion having a concave face forming spaced apart flexible peripherally extending seal forming lips.

6. A seal forming element of generally ring shaped configuration formed in one continuous piece of resilient material having diametrically oppositely disposed annular portions and arcuate portions positioned in the same general plane with and connected at their opposite ends to said annular portions at diametrically opposite locations, each of said arcuate portions having a concave face forming spaced apart, flexible, peripherally extending seal forming lips.

7. In a butterfly valve assembly the combination with a casing having a cylindrical flowway and diametrically oppositely disposed shaft bearings, a valve disk in the flowway, a shaft mounted for rotation in said bearings and upon which the valve is supported for rotation with the shaft to one position to close the flowway and to another position to open the same, said casing having an internal groove provided with annular portions surrounding the shaft and portions extending between and connecting said annular portions, of a seal forming element of generally ring shaped configuration formed in one continuous piece having diametrically oppositely disposed annular portions shaped to be positioned in the annular portions of the groove, and arcuate portions connected at their opposite ends to said annular portions of the element to be positioned in said connecting portions of the groove, said element being formed of resilient material and in one general plane to allow the element to be distorted to position said annular portions of the element in planes substantially at right angles to said one plane when the element is in position in the groove, said element being shaped to extend into the flowway for sealing contact with the valve and casing about said shaft in all positions of the valve, said arcuate portions having flexible, peripherally extending portions extending radially inwardly beyond the outermost peripheral portion of the disk in position for sealing engagement with the valve under the influence of the pressure of fluid in the flowway when the valve is closed.

8. In a seal forming element of generally ring shaped configuration formed in one piece of resilient material, diametrically oppositely disposed annular portions, arcuate portions positioned in the same general plane with and connected at their opposite ends to said annular portions at diametrically opposite locations, said annular and arcuate portions each having a concave face on the same side of said plane forming spaced apart, flexible, peripherally extending seal forming lips.

References Cited in the file of this patent

UNITED STATES PATENTS

| | | |
|---|---|---|
| Re. 23,613 | Danks | Jan. 13, 1953 |
| 1,844,641 | DeWein | Feb. 9, 1932 |
| 2,847,181 | Muller | Aug. 12, 1958 |
| 2,911,184 | Moore | Nov. 3, 1959 |
| 2,912,218 | Stillwagon | Nov. 10, 1959 |
| 2,936,778 | Stillwagon | May 17, 1960 |